(12) United States Patent
Yoshihara

(10) Patent No.: US 10,429,916 B2
(45) Date of Patent: Oct. 1, 2019

(54) CONTROL APPARATUS THAT CONTROLS A MEMORY AND POWER SAVING CONTROL METHOD FOR THE MEMORY

(71) Applicant: CANON KABUSHIKI KAISHA, Tokyo (JP)

(72) Inventor: Toshio Yoshihara, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 15/333,712

(22) Filed: Oct. 25, 2016

(65) Prior Publication Data

US 2017/0123473 A1    May 4, 2017

(30) Foreign Application Priority Data

Oct. 30, 2015 (JP) ................. 2015-215216

(51) Int. Cl.
*G06F 1/324* (2019.01)
*G06F 1/3234* (2019.01)
*G06F 1/3237* (2019.01)

(52) U.S. Cl.
CPC ............ *G06F 1/324* (2013.01); *G06F 1/3237* (2013.01); *G06F 1/3275* (2013.01); *G06F 1/3284* (2013.01); *Y02D 10/128* (2018.01); *Y02D 10/14* (2018.01); *Y02D 50/20* (2018.01)

(58) Field of Classification Search
CPC ...... G06F 1/324; G06F 1/3237; G06F 1/3275; G06F 1/3284; Y02D 10/14; Y02D 50/20; Y02D 10/128
USPC ................................. 713/322, 323
See application file for complete search history.

(56) References Cited

U.S. PATENT DOCUMENTS

| | | | | |
|---|---|---|---|---|
| 6,657,634 B1* | 12/2003 | Sinclair | ................. | G06F 1/3218 345/534 |
| 7,523,282 B1* | 4/2009 | Kapil | .................... | G06F 1/3225 365/233.11 |
| 8,656,198 B2* | 2/2014 | Branover | ............. | G06F 1/3203 713/323 |
| 2003/0235103 A1* | 12/2003 | Raad | ..................... | G06F 1/3203 365/222 |
| 2008/0002485 A1* | 1/2008 | Kim | .................... | G11C 7/1051 365/198 |
| 2010/0250981 A1* | 9/2010 | Pamley | ................. | G06F 1/3203 713/320 |
| 2011/0004774 A1* | 1/2011 | Hansquine | ............ | G06F 1/3203 713/310 |
| 2011/0235459 A1* | 9/2011 | Ware | ........................ | G11C 7/04 365/233.11 |
| 2011/0264934 A1* | 10/2011 | Branover | ............. | G06F 1/3203 713/320 |

(Continued)

FOREIGN PATENT DOCUMENTS

JP    2007-134840 A    5/2007
JP    2011-150653 A    8/2011

(Continued)

*Primary Examiner* — Ji H Bae
(74) *Attorney, Agent, or Firm* — Canon U.S.A., Inc. IP Division

(57) ABSTRACT

A control apparatus that controls a memory, where the memory is capable of being shifted in accordance with a control signal to a power saving state. According to one embodiment, the control apparatus shifts the memory to the power saving state using the control signal on a basis of stopping of a clock signal input to the memory.

16 Claims, 6 Drawing Sheets

(56) References Cited

U.S. PATENT DOCUMENTS

2011/0264937 A1* 10/2011 Meisner ................ G06F 1/3228
          713/323
2014/0337645 A1* 11/2014 Ware ................... G11C 11/4072
          713/320

FOREIGN PATENT DOCUMENTS

| JP | 2012-150593 A | 8/2012 |
| JP | 2013025843 A | 2/2013 |

* cited by examiner

CONTROL APPARATUS THAT CONTROLS A MEMORY AND POWER SAVING CONTROL METHOD FOR THE MEMORY

BACKGROUND OF THE INVENTION

Field of the Invention

Various embodiments of the present invention relate to a power saving control method for a memory.

Description of the Related Art

A memory module in which a low power consumption mode can be set and cancelled by a control signal has been proposed (see Japanese Patent Laid-Open No. 2013-25843). This memory module includes an input node where a control signal called a resume standby signal (hereinafter, will be referred to as an RS signal) is input, and a state of the memory module is shifted to a resume state or shifted to a standby state in accordance with the RS signal.

In addition, according to Japanese Patent Laid-Open No. 2013-25843, the control signals are input to a plurality of memory modules belonging to the same memory block in a parallel manner to propagate in paths within the modules, and part of the memory modules outputs the control signals to paths outside the downstream modules. As a result, generation of a rush current is mitigated when the low power consumption mode in the plurality of memory modules is cancelled.

SUMMARY OF THE INVENTION

When a power supply voltage to a circuit in a memory module is input or cut for shifting to a low power consumption mode or returning from the low power consumption mode, a clock signal input to the memory module may affect the power supply voltage in some cases. For example, a fluctuation of the power supply voltage may be generated in some cases by a toggle of the clock signal having a frequency that has been increased in recent years.

In view of the above, various embodiments of the present invention aim at alleviating an influence of the power supply voltage input to the memory module onto the power supply voltage inside the memory module when the memory module is shifted to the low power consumption mode.

According to one embodiment, a control apparatus that controls a memory, where the memory is capable of being shifted in accordance with a control signal from a first power state to a second power state in which power consumption is lower than that in the first power state is provided. The control apparatus includes a first control unit configured to control outputting and stopping of a clock signal input to the memory, and a second control unit configured to shift the memory to the second power state using the control signal on a basis of the stopping of the clock signal by the first control unit.

Further features of the present invention will become apparent from the following description of exemplary embodiments with reference to the attached drawings.

DESCRIPTION OF THE EMBODIMENTS

First Exemplary Embodiment

Hereinafter, exemplary embodiments for carrying out various embodiments of the present invention will be described with reference to the drawings. A power saving control method for a memory will be described below while a digital multifunctional device (MFP) having a plurality of functions such as scanning, printing, and copying is used as an example.

Figure 1:
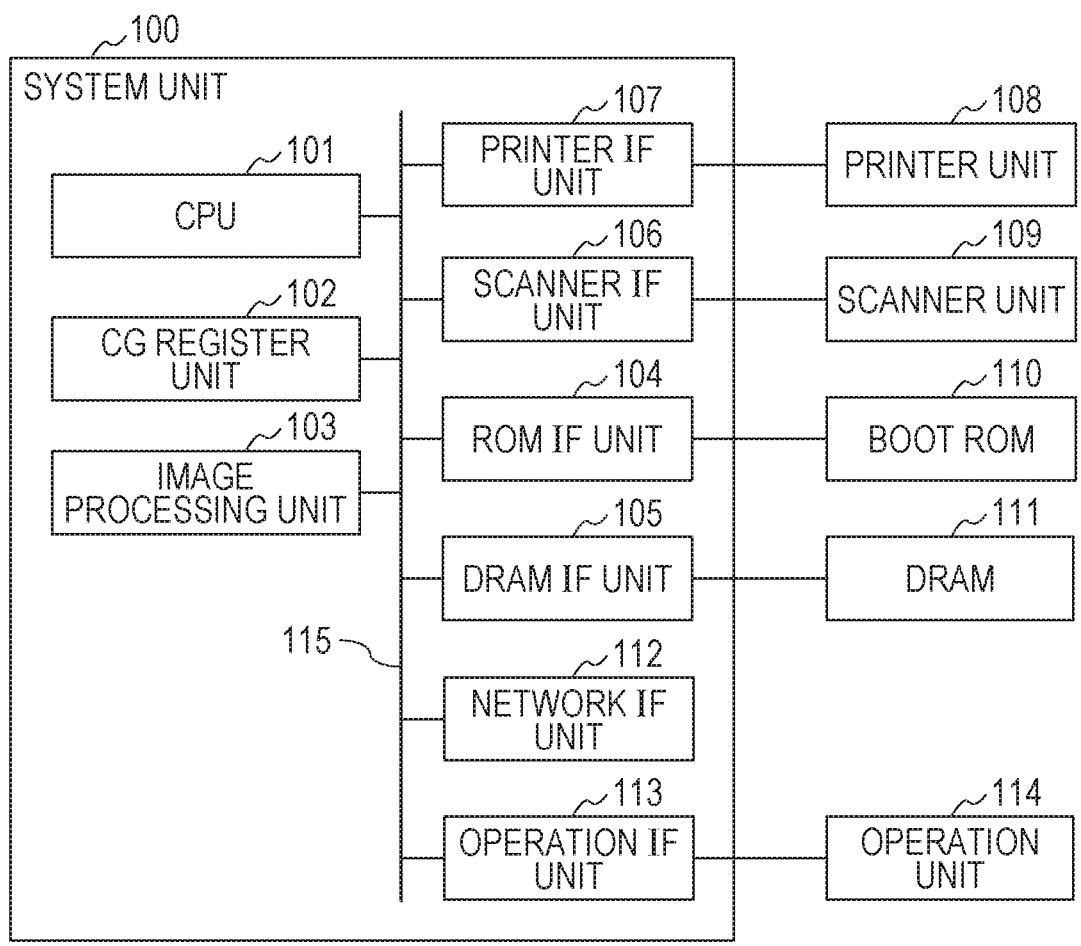
FIG. 1 is a block diagram of an entire system according to one embodiment.

FIG. 1 is a block diagram of an entire system according to one embodiment. The MFP includes a system unit 100, a printer unit 108, a scanner unit 109, a boot ROM 110, a DRAM 111, and an operation unit 114.

The system unit 100 includes a CPU 101, a CG register unit 102, an image processing unit 103, a ROM interface (IF) unit 104, a DRAM IF unit 105, a scanner IF unit 106, a printer IF unit 107, a network IF unit 112, and an operation IF unit 113.

The printer unit 108 functions as an image output device, and the scanner unit 109 functions as an image input device. The system unit 100 and the printer unit 108 are connected to each other via the printer IF unit 107, and the system unit 100 and the scanner unit 109 are connected to each other via the scanner IF unit 106. While the system unit 100 controls these devices, reading of image data and printing of the image data are realized. The respective components in the system unit 100 are connected to one another by a bus 115.

The CPU 101 performs setting of the CG register unit 102, setting of the image processing unit 103, and control of the image data. For example, the CPU 101 controls output of the image data that has been input from the scanner unit 109 to the printer unit 108 and realizes a copying function. The CPU 101 executes an operation system (OS) or application program expanded in the DRAM 111.

The CG register unit 102 is provided with a register configured to control oscillation and stopping of a clock used in the image processing unit 103. While the CPU 101 rewrites a value of the register, the oscillation and stopping of the clock are performed. Although not illustrated in FIG. 2, the system unit 100 is operated by a clock multiplied by a phase-locked loop (PLL) or the like, and the image processing unit 103 is also operated by the clock. The CG register unit 102 includes the register configured to control the oscillation and stopping of the above-described clock.

The image processing unit 103 is a circuit configured to perform various image processings, and the various image processings are performed in accordance with control by the CPU 101. As examples of the image processings, the various image processings such as rotation of the image data, magnification, color processing, trimming and masking, binary conversion, multivalued conversion, and blank sheet determination are performed. In addition, as print image processing, correction or the like in accordance with the printer unit 108 is performed on the image data printed by the printer unit 108. As scanned image processing, correction, process, editing, or the like is performed on the image data read by the scanner unit 109.

The ROM IF unit 104 is an interface module configured to access the boot ROM 110. When power is input to the system unit 100, the CPU 101 accesses the boot ROM 110 via a ROM IF unit 110 and executes a boot program in the boot ROM 110 so that the CPU 101 is booted.

The DRAM IF unit 105 is an interface module configured to access the DRAM 111. The DRAM IF unit 105 is provided with a register configured to perform setting and control of the DRAM 111, and this register can be accessed from the CPU 101.

The operation IF unit 113 accepts an operation instruction performed by a user using the operation unit 114 and displays an operation result on the operation unit 114.

The network IF unit 112 is a LAN card or the like. The network IF unit 112 is connected to a network such as a LAN that is not illustrated in the drawing and communicates device information or the image data with an external apparatus.

Figure 2:
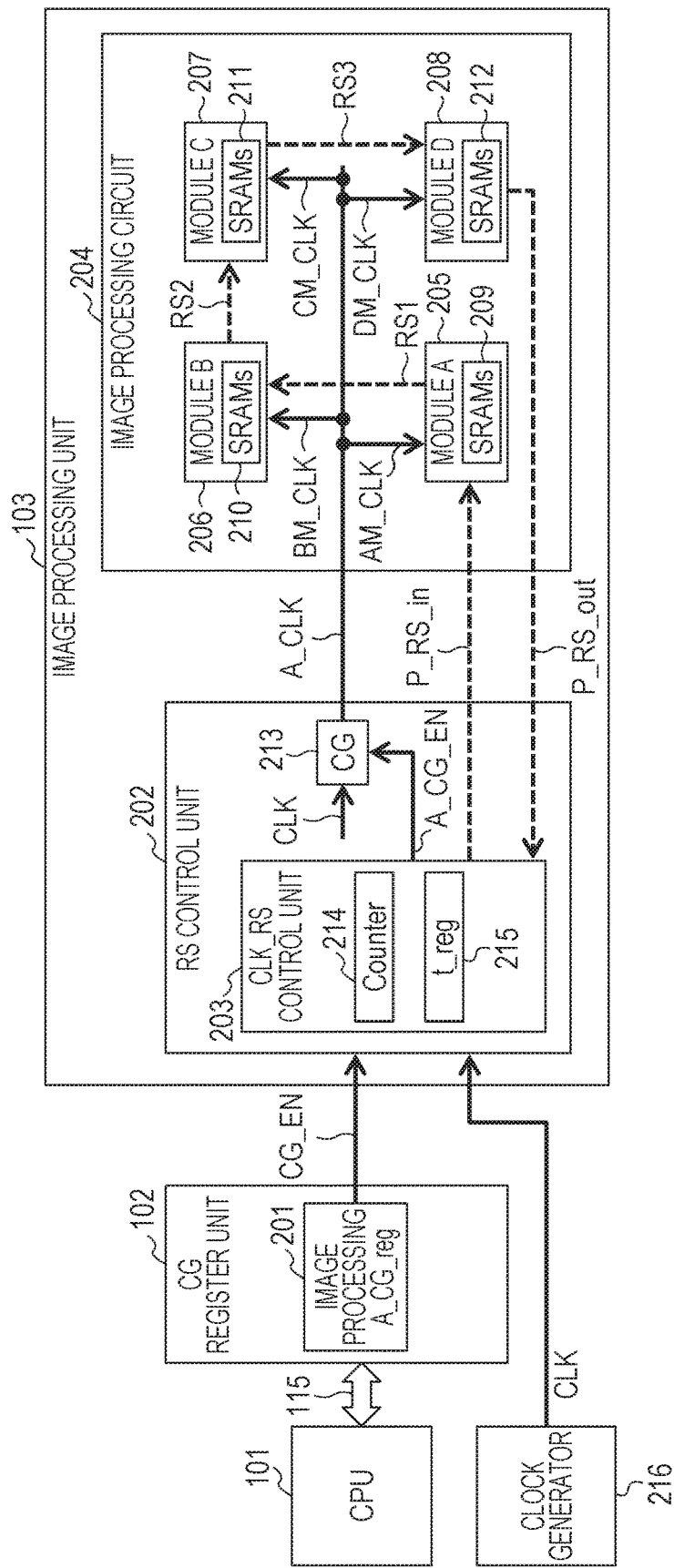
FIG. 2 is a block diagram of an image processing unit according to one embodiment.

FIG. 2 is a block diagram of the image processing unit 103 according to one embodiment.

The CPU 101 accesses the CG register unit 102 via the bus 115. The CG register unit 102 is provided with an image processing A_CG_reg 201. The image processing A_CG_reg 201 outputs a control signal (CG_EN) for controlling a clock signal (A_CLK) input to the image processing circuit 204 in accordance with a register setting of the CPU 101. That is, oscillation and stopping of the clock signal (A_CLK) input to the image processing circuit 204 are controlled in accordance with the register setting by the CPU 101.

The image processing unit 103 is provided with an RS control unit 202 and an image processing circuit 204.

The RS control unit 202 is provided with a CLK_RS control unit 203 and a clock gating cell (CG) 213. According to the present exemplary embodiment, a static RAM (SRAM) can be shifted to a plurality of power states including at least an RS mode and a normal mode. The RS control unit 202 performs control of an RS signal (P_RS_in) for controlling transition to the RS mode and returning to the normal mode and control of the clock signal.

The CLK_RS control unit 203 is provided with a Counter 214 and a t_reg 215. The Counter 214 is a counter circuit. The Counter 214 counts an output timing of an A_CG_EN signal from a P_RS_out signal, and the CLK_RS control unit 203 controls the output of the A_CG_EN signal. In addition, the Counter 214 counts an output timing of the P_RS_in signal for controlling the RS mode from the output of the A_CG_EN signal, and the CLK_RS control unit 203 controls the output of the P_RS_in signal at the above-described output timing.

It should be noted that the Counter 214 may count an output timing of the P_RS_in signal for controlling the RS mode from input of the CG_EN signal, and the CLK_RS control unit 203 may control the output of the P_RS_in signal at the above-described output timing.

The t_reg 215 is a register and can be set by the CPU 101. It is possible to change a time since A_CG_EN is set at High until P_RS_in is set at High on the basis of a register value of the t_reg 215. A detail thereof will be described with reference to FIG. 5.

The CG 213 outputs an operation clock (A_CLK) of the image processing circuit 204 on the basis of an operation clock (CLK) of the image processing unit 103 and also controls the oscillation and stopping of A_CLK in accordance with the A_CG_EN signal. A clock generator 216 generates the operation clock (CLK) of the image processing unit 103.

The image processing circuit 204 is a circuit configured to perform image processing and is constituted by a module A 205, a module B 206, a module C 207, and a module D 208. According to the present exemplary embodiment, the descriptions will be given while the four modules are used, but the number of modules may be higher than four and may be lower than four. In addition, according to the present exemplary embodiment, the descriptions will be given while only the image processing circuit 204 is illustrated in the drawing, but a plurality of circuits like the image processing circuits 204 may be provided.

The module A, the module B, the module C, and the module D respectively include SRAM blocks 209, 210, 211, and 212, and the respective SRAM blocks are constituted by a plurality of SRAMs.

Figure 3:
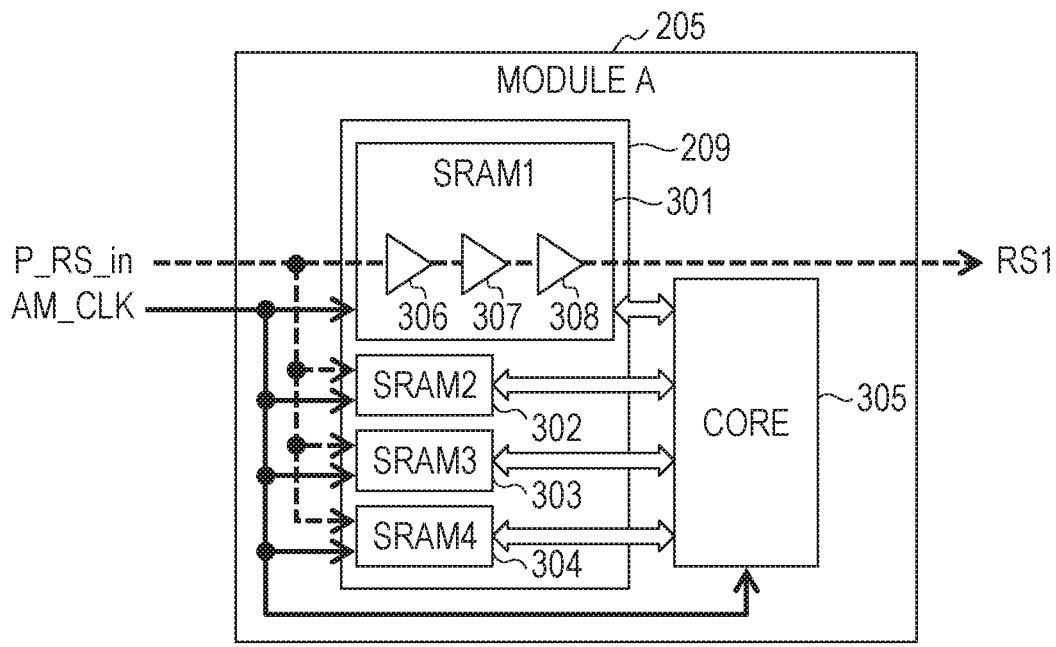
FIG. 3 is a block diagram of a module according to one embodiment.

FIG. 3 is a block diagram of the module A. Each of the modules B to D also has a configuration similar to the module A according to one embodiment.

The module A is constituted by the SRAM block 209 provided with an SRAM1 301, an SRAM2 302, an SRAM3 303, and an SRAM4 304, and a CORE 305 functioning as an image processing circuit. The SRAM1, the SRAM2, the SRAM3, and the SRAM4 are connected to the CORE 305.

The P_RS_in signal corresponding to an input signal to the module A, which is represented by a broken line in FIG. 3, is connected to the SRAM1, the SRAM2, the SRAM3, and the SRAM4. When the P_RS_in signal is High, the SRAM1, the SRAM2, the SRAM3, and the SRAM4 are shifted to the RS mode. The SRAM1, the SRAM2, the SRAM3, and the SRAM4 are put into a power saving state when the SRAM1, the SRAM2, the SRAM3, and the SRAM4 are shifted to the RS mode. An AM_CLK signal corresponding to an input signal to the module A is a clock signal and is connected to the SRAM1, the SRAM2, the SRAM3, the SRAM4, and the CORE 305.

An RS1 signal corresponding to an output signal from the module A is a signal obtained when the P_RS_in signal input to the SRAM 1 is delayed by buffer cells 306 to 308. The RS1 signal is generated from an SRAM having a largest storage capacity among the SRAM block. According to the present exemplary embodiment, since the SRAM 1 is the SRAM that has the largest storage capacity, the RS1 signal is output from the SRAM 1.

A size of the storage capacity of the SRAM and a time used for the transition to the RS mode or the returning to the normal mode have a correlation relationship. A delay time is created by using the buffer cell or the like such that the time until the RS signal is output is set to be longer as the storage capacity is larger. This is because, since a scale of a memory array unit constituting the SRAM or a peripheral circuit is also increased when the storage capacity of the SRAM is large, those components need much time until a power supply node and a signal node inside the components are stabilized so that the components are put into an operable state. In this manner, the P_RS_in signal input to the module A stands by and is then output as the RS1 signal when the power supply and the like are stabilized.

Figure 4:
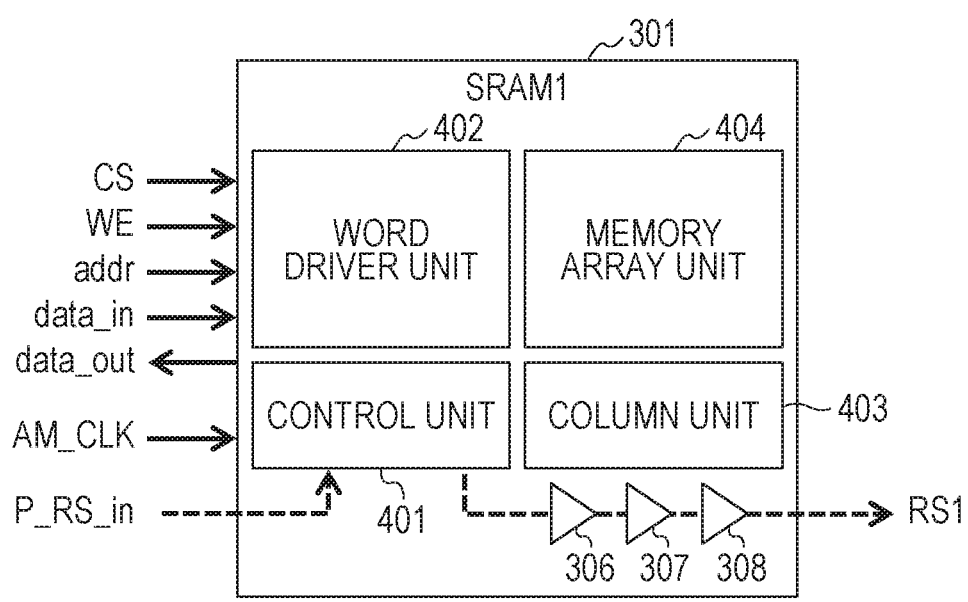
FIG. 4 is a block diagram of an SRAM according to one embodiment.

FIG. 4 is a block diagram of the SRAM according to one embodiment. A configuration of the SRAM will be described with reference to FIG. 4 while the SRAM 1 is used as an example. Input signals include CS, WE, addr, data_in, AM_CLK, and P_RS_in, and output signals include data_out and RS1.

A control unit 401 is provided with a timing control circuit configured to generate a timing signal of a memory operation from the CS signal or the WE signal. The control unit 401 is also provided with a circuit configured to control power supply of a word driver unit 402 and a column unit 403 in accordance with the P_RS_in signal and interrupt power of the word driver unit 402 and the column unit 403 when the P_RS_in signal is High. Furthermore, the power supply can also be interrupted in a section other than the RS control of the control unit 401 when the P_RS_in signal is High. As described above, the P_RS_in signal is delayed by the control unit 401 and the buffer cells 306 to 308 to be output as the RS1 signal.

The word driver unit 402 is a block configured to decode the addr signal and determine which row to be activated in a memory array unit 404. Power to the word driver unit 402 is interrupted by the control unit 401 at the time in the RS mode.

The column unit 403 is a block configured to decode the addr signal and determine which column to be activated in the memory array unit 404. Power to the column unit 403 is interrupted by the control unit 401 at the time in the RS mode.

According to the present exemplary embodiment, the power interruption of the word driver unit 402 and the column unit 403 and the oscillation of the clock signal are not overlapped with each other at the time of the transition to the RS mode, so that the voltage fluctuation in the memory array unit 404 is suppressed.

Static type memory cells are arranged in a matrix in the memory array unit 404. The memory array unit 404 holds data in the memory cell determined by the word driver unit 402 and the column unit 403. While power is distributed to the memory array unit 404 also at the time in the RS mode, and as a result, it is possible to hold the data at the time in the RS mode.

In FIG. 2, the RS1 signal output from the module A is input to the module B and output as an RS2 signal from the SRAM having the largest storage capacity among the SRAM block 210. The RS2 signal is input to the module C. Similarly, an RS3 signal is output from the module C and input to the module D. The RS3 signal lastly input to the module D is output as the P_RS_out signal and input to the CLK_RS control unit 203. The RS signals of the modules A to D are connected to one another in a chain manner as described above, and the modules A to D relay the RS signal.

Figure 5:
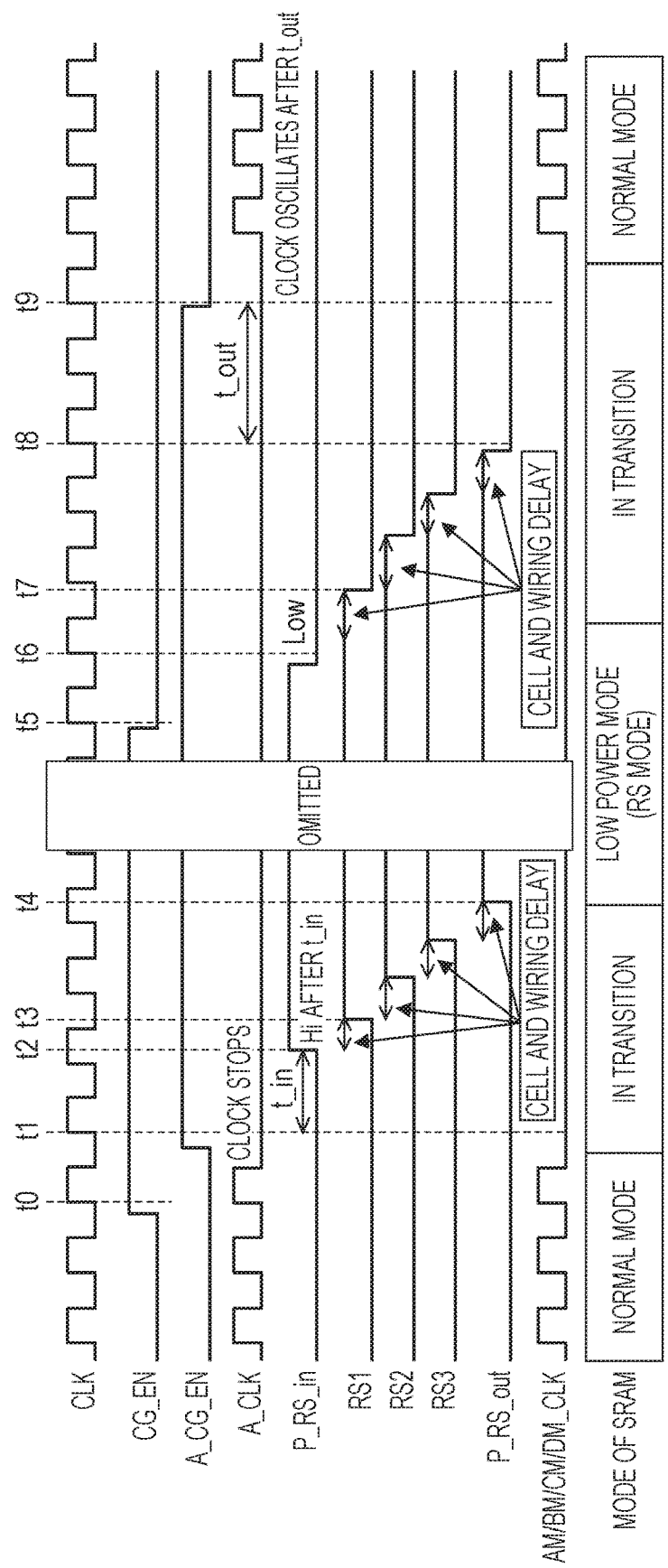
FIG. 5 is a timing chart illustrating timings when a clock signal and a control signal are output according to one embodiment.

FIG. 5 is a timing chart illustrating timings when a clock signal and a control signal are output according to a first exemplary embodiment according to one embodiment.

CLK corresponding to the operation clock of the image processing unit 103 is output from a clock generation module that is not illustrated in the drawing and regularly oscillates when the power supply of the system unit 100 is input.

First, a transition sequence to the RS mode of the SRAM will be described.

At a time t0, the CPU 101 accesses the image processing A_CG_reg 201 of the CG register unit 102 via the bus 115 and sets the CG_EN signal at High that indicates clock stopping. A timing for setting the CG_EN signal at High is a time when software determines that image processing A is in an unused state.

When the CG_EN signal turns to High, the CLK_RS control unit 203 sets the A_CG_EN signal at High at a time t1, and the CG 213 stops A_CLK (clock stopping state). As a result, AM_CLK, BM_CLK, CM_CLK, and DM_CLK in the image processing A stop, and the clock of the SRAM in the image processing A stops.

At a time t2 corresponding to a time after an elapse of a t_in time since the A_CG_EN signal turns to High to stop A_CLK at the time t1, the CLK_RS control unit 203 sets the P_RS_in signal at High. As a result, since the clock input to the SRAM stops when the SRAM is put into the RS mode, the voltage fluctuation when the SRAM is put into the RS mode is suppressed, and it is possible to secure the data holding.

The appropriate t_in time varies depending on a storage holding capacity of the SRAM. As the capacity is larger, the time is longer. In view of the above, the t_in time is adjusted by the t_reg 215, and it is possible to set the time appropriate to the capacity of the SRAM.

When the P_RS_in signal turns to High at the time t2, the RS1 signal turns to High by cell and wiring delay at a time t3. Similarly, after the RS1 signal turns to High and the cell and wiring delay occurs, the RS2 signal turns to High. After the RS2 signal turns to High and the cell and wiring delay occurs, the RS3 signal turns to High. Subsequently, after the RS3 signal turns to High and the cell and wiring delay occurs, the P_RS_out signal turns to High at a time t4, so that the transition to the RS mode is completed in all the SRAMs in the image processing A.

Next, a returning sequence to the normal mode of the SRAM will be described.

A time before a time t5, the CPU 101 accesses the image processing A_CG_reg of the CG register unit 102 via the bus 115 and sets the CG_EN signal at Low that indicates clock oscillation. A timing for setting the CG_EN signal at Low is a time when the software determines that the image processing A is used.

When CG_EN turns to Low at the time t5, the CLK_RS control unit 203 sets the P_RS_in signal at Low at a time t6. Then, as in the transition to the RS mode, the RS1 signal, the RS2 signal, the RS3 signal, and the P_RS_out signal sequentially turn to Low. At a time t9 corresponding to a time after an elapse of a t_out time since the P_RS_out signal turns to Low at a time t8, the CLK_RS control unit 203 sets the A_CG_EN signal at Low.

The appropriate t_out time varies depending on the storage holding capacity of the SRAM. As the capacity is larger, the time is longer. In view of the above, the t_out time is adjusted by the t_reg 215, and it is possible to set the time appropriate to the capacity of the SRAM.

In response to a situation where A_CG_EN turns to Low, the CG 213 oscillates A_CLK, and the transition to the normal mode is completed in all the SRAMs in the image processing A.

As described above, the RS control unit 202 controls the transition and returning of the RS mode in accordance with the stopping and oscillation control of the clock signal. For example, according to the timing chart of FIG. 5, after the clock signal input to the SRAM stops, the SRAM is shifted to the low power consumption mode, so that the clock signal does not affect the power supply of the SRAM when the SRAM is shifted to the low power consumption mode.

As a result, it is possible to control the timings of the RS signal and the clock signal such that the data in the memory array unit 404 in the SRAM can be appropriately held.

Second Exemplary Embodiment

According to the first exemplary embodiment, the method of controlling the RS signal for controlling the transition to the RS mode and the returning to the normal mode of the SRAM and the clock signal input to the SRAM in accordance with the stopping and oscillation control of the clock signal based on the software control from the CPU 101 has been described.

According to a second exemplary embodiment, descriptions will be given of a method for the transition to the RS mode and the returning to the normal mode in a case where the control of the clock signal by the software is not performed. According to the second exemplary embodiment, a module E will be used as the example in the following explanation.

Figure 6:
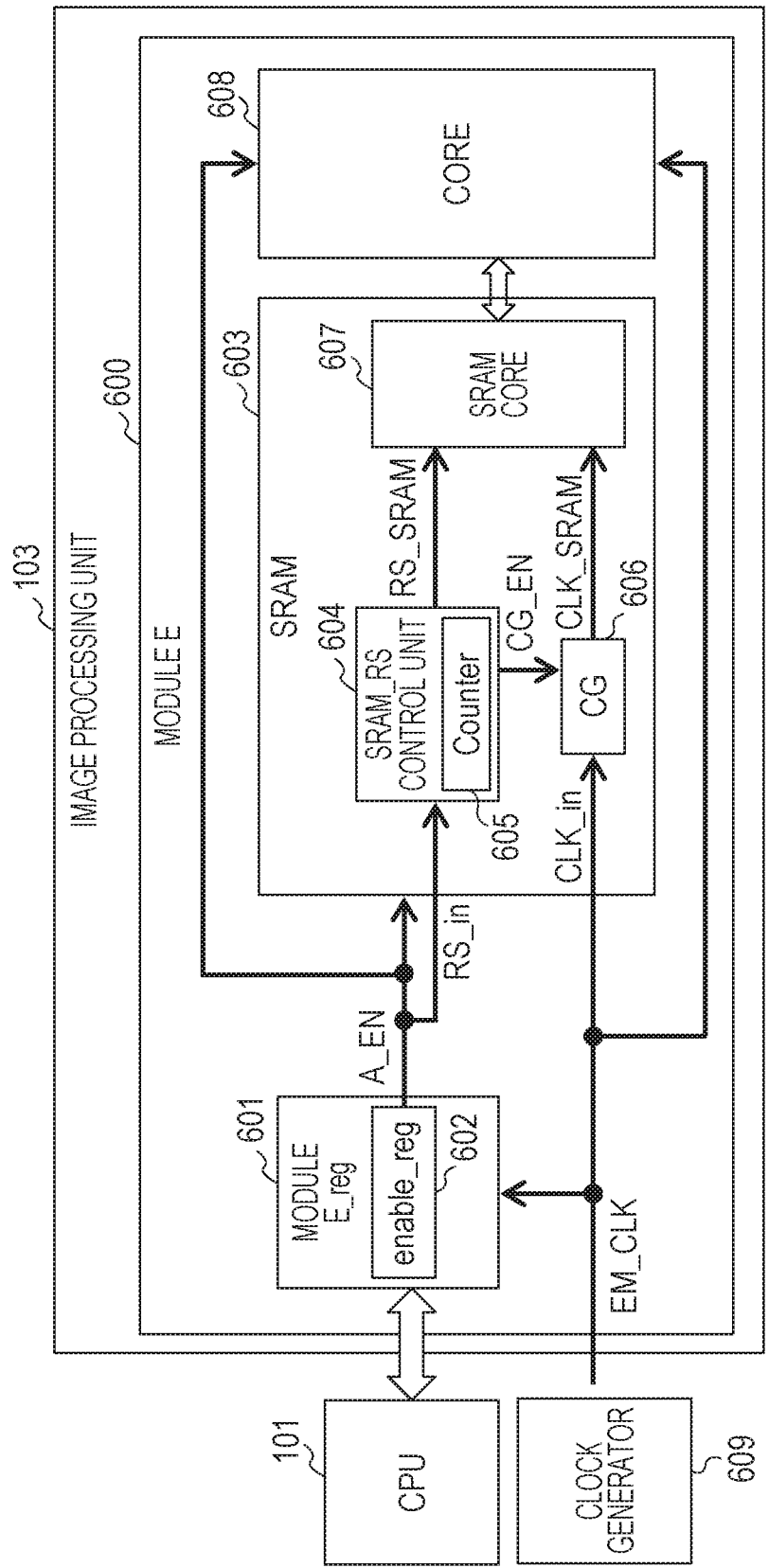
FIG. 6 is a block diagram of another module according to one embodiment.

FIG. 6 is a block diagram of the module E according to one embodiment.

A module E 600 includes a module E_reg 601, an SRAM 603, and a CORE 608. EM_CLK is an operation clock input to the module E 600 and is generated by a clock generator 609.

The module E_reg 601 is provided with a plurality of registers used for a setting of image processing of the module E 600, and register values are set from the CPU 101. An enable_reg 602 corresponding to one of the registers in the module E_reg 601 is a register that is set when the module E 600 is used. The enable_reg 602 is set by the CPU 101 such that an A_EN signal turns to High when the module E 600 is used, and the A_EN signal turns to Low when the module E 600 is unused. That is, in a case where the module E is in an operating state, the A_EN signal turns to High, and in a case where the module E is in a non-operating state, the A_EN signal turns to Low. The A_EN signal is input to the SRAM 603 and the CORE 608 functioning as an image processing circuit.

The SRAM 603 is provided with an SRAM_RS control unit 604, a CG 606, and an SRAM core 607.

The SRAM_RS control unit 604 controls an RS signal of the SRAM core 607 and the clock signal. According to the control method, such control is performed that output timings of an RS_SRAM signal and the CG_EN signal are controlled in accordance with the A_EN signal by using a Counter 605, and the clock signal stops at the time of the transition to the RS mode.

The CG 606 performs control to determine whether to transmit EM_CLK input as a CLK_in signal as a CLK_SRAM signal as it is in accordance with the CG_EN signal or stop the CLK_SRAM signal.

The SRAM core 607 has a configuration similar to the SRAM 1 described with reference to FIG. 4. The RS_SRAM signal of FIG. 6 corresponds to the P_RS_in signal of FIG. 4, and CLK_SRAM of FIG. 6 corresponds to AM_CLK of FIG. 4. The respective control signals are connected between the SRAM core 607 and the CORE 608.

The CORE 608 is the image processing circuit of the module E 600 and is connected to the SRAM 603 to perform processing used for image processing. For example, the CORE 608 temporarily stores the image data as a buffer and performs image processing such as processing of taking out certain rectangular range data.

Figure 7:
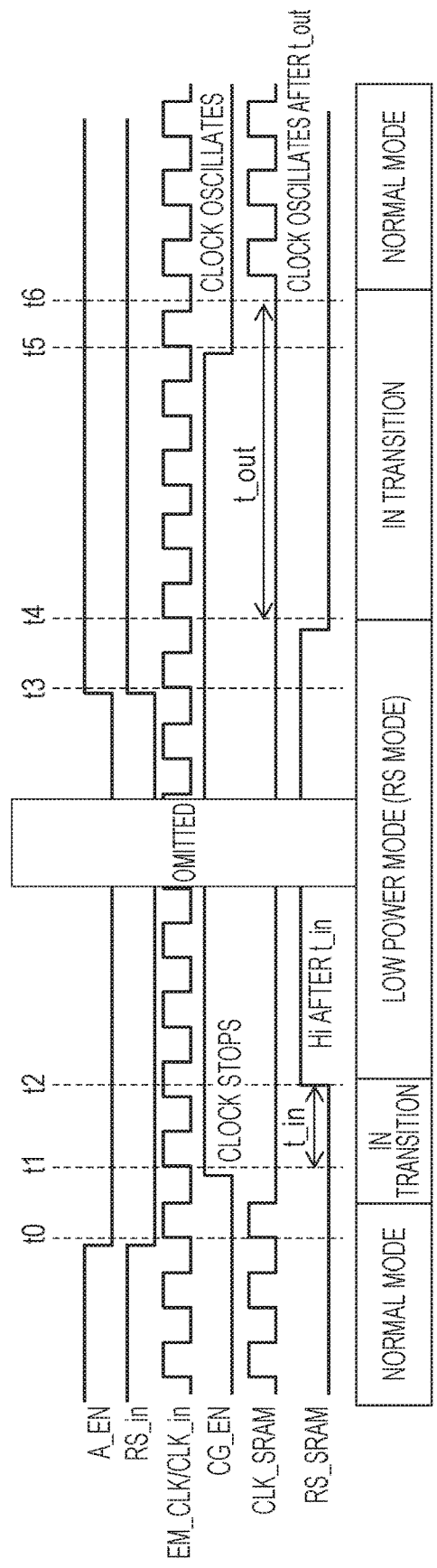
FIG. 7 is a timing chart illustrating timings when the clock signal and the control signal are output according to one embodiment.

FIG. 7 is a timing chart illustrating timings when the clock signal and the control signal are output according to the second exemplary embodiment according to one embodiment.

First, a transition sequence to the RS mode will of the SRAM be described.

In a case where the module E 600 is being used, the A_EN signal is in a High state.

At the time t0, when the CPU 101 sets a value indicating an unused state in a register of the enable_reg 602 in the module E_reg 601, the A_EN signal turns to Low.

When the A_EN signal input as input as an RS_in signal is Low, the SRAM_RS control unit 604 sets the CG_EN signal at High at the time t1. When the CG_EN signal turns to High, the CG 606 stops CLK_SRAM.

At the time t2 corresponding to a time after an elapse of the t_in time since the CG_EN signal turns to High, the SRAM_RS control unit 604 sets the RS_SRAM signal at High. An appropriate time of the t_in time can be determined by a storage capacity of the SRAM core 607. The time is longer as the storage capacity is larger.

With the above-described processing, the transition to the RS mode in the SRAM core 607 is completed.

Next, a returning sequence to the normal mode of the SRAM will be described.

At the time t3, when the CPU 101 sets a value indicating a used state in the register of the enable_reg 602 in the module E_reg 601, the A_EN signal turns to High.

In response to a situation where the A_EN signal input as the RS_in signal turns to High, the SRAM_RS control unit 604 sets the RS_SRAM signal at Low at the time t4. At the time t5 corresponding to the time after the elapse of the t_out time since RS_SRAM turns to Low, the SRAM_RS control unit 604 sets the CG_EN signal at Low. Similarly as in the t_in time, the appropriate t_out time is determined by a storage capacity of the SRAM core 607. The time is longer as the storage capacity is larger.

In response to a situation where the CG_EN signal turns to Low, the CG 606 oscillates CLK_SRAM at the time t6.

With the above-described processing, the transition to the normal mode in the SRAM core 607 is completed.

As described above, in a case where the clock control of EM_CLK corresponding to the operation clock of the module E is not performed, the output timings of the RS signal and the clock signal are controlled by using the register value of the module E which indicates the used or unused state. As a result, it is possible to control the timings of the RS signal and the clock signal such that the data in the memory array unit 404 in the SRAM is appropriately held.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-215216, filed Oct. 30, 2015, which is hereby incorporated by reference herein in its entirety.

What is claimed is:

1. A control apparatus comprising:
a storage device having a memory array which stores data, a memory array driver which controls reading the data from the memory array and writing the data to the memory array, and a power controller which controls power supply to the memory array driver,
wherein the storage device is shifted in accordance with a first control signal from a first power state to a second power state, and
wherein power is supplied to the memory array driver and the memory array in the first power state, and power is supplied to the memory array but not to the memory array driver in the second power state;
a register that outputs a second control signal; and
a control circuit configured to output the first control signal and a clock signal that is input to the storage device, wherein the first control signal is input to the storage device,
wherein the control circuit stops outputting the clock signal that is input to the storage device based on receipt of the second control signal output by the register, and then outputs the first control signal to the storage device.

2. The control apparatus according to claim 1, wherein the control circuit further outputs the first control signal, based on a lapse of a first delay period of time after the control circuit stops outputting the clock signal that is input to the storage device.

3. The control apparatus according to claim 1, wherein the control circuit stops outputting the second control signal for instructing the storage device to be shifted from the second power state to the first power state, and then starts outputting the clock signal to the storage device.

4. The control apparatus according to claim 3, wherein the control circuit further starts outputting the clock signal to the storage device based on a second delay period of time elapses after the control circuit stops outputting the second control signal.

5. The control apparatus according to claim 2, wherein the first delay period of time is changeable.

6. The control apparatus according to claim 4, wherein the second delay period of time is changeable.

7. The control apparatus according to claim 1, further comprising:
a clock generator configured to output the clock signal that is then input to the control circuit,
wherein the control circuit
controls whether to output the clock signal input from the clock generator, and
outputs the first control signal input to the storage device based on stopping outputting the clock signal input from the clock generator.

8. The control apparatus according to claim 7, wherein the control circuit starts outputting the clock signal input from the clock generator based on stopping outputting the second control signal.

9. The control apparatus according to claim 7, wherein the control circuit gates the clock signal input from the clock generator and stops outputting the clock signal to the storage device.

10. The control apparatus according to claim 3,
wherein, in a case where a plurality of storage devices exist that can be shifted in accordance with the second control signal from the first power state to the second power state, each of the plurality of storage devices outputs the second control signal to a next storage device after an input of the second control signal,
wherein each of the plurality of storage devices stops outputting the second control signal to the next storage device after a stopping of the input of the second control signal, and
wherein the control circuit starts outputting the clock signal on a basis of stopping of the second control signal output by a storage device to which the second control signal is input last among the plurality of storage devices.

11. The control apparatus to claim 1,
wherein the first control signal is a signal for instructing the storage device to shift a power state.

12. The control apparatus according to claim 1,
wherein the control circuit outputs the clock signal that is input to the storage device until the control circuit receives the second control signal output by the register.

13. The control apparatus according to claim 1,
wherein the control circuit does not output the first control signal until the control circuit stops outputting the clock signal that is input to the storage device.

14. The control apparatus according to claim 1, further comprising an image processing circuit configured to process image data,
wherein the storage device stores data to be used for image processing by the image processing circuit.

15. The control apparatus according to claim 1, further comprising
a processor configured to set the register.

16. The control apparatus according to claim 1,
wherein the storage device is a SRAM (Static Random Memory).

* * * * *